US010721419B2

United States Patent
Cohen et al.

(10) Patent No.: US 10,721,419 B2
(45) Date of Patent: Jul. 21, 2020

(54) ORTHO-SELFIE DISTORTION CORRECTION USING MULTIPLE IMAGE SENSORS TO SYNTHESIZE A VIRTUAL IMAGE

(71) Applicant: International Business Machines Corporation, Armonk, NY (US)

(72) Inventors: Guy M. Cohen, Ossining, NY (US); Lior Horesh, North Salem, NY (US); Raya Horesh, North Salem, NY (US); Marco Pistoia, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/826,789

(22) Filed: Nov. 30, 2017

(65) Prior Publication Data
US 2019/0166314 A1 May 30, 2019

(51) Int. Cl.
*H04N 5/265* (2006.01)
*H04N 5/262* (2006.01)
(Continued)

(52) U.S. Cl.
CPC ............. *H04N 5/265* (2013.01); *G06T 5/002* (2013.01); *G06T 5/006* (2013.01); *G06T 5/50* (2013.01);
(Continued)

(58) Field of Classification Search
CPC .. H04N 5/272; H04N 5/23296; H04N 5/2258; H04N 5/23245; H04N 5/262;
(Continued)

(56) References Cited

U.S. PATENT DOCUMENTS 5,897,604 A 4/1999 Takahashi et al.
6,259,470 B1 * 7/2001 Koizumi ................. G06T 15/10
348/14.01
(Continued)

FOREIGN PATENT DOCUMENTS

CN 201114613 Y 9/2008
CN 104010115 A 8/2014
(Continued)

OTHER PUBLICATIONS

D.H. Baker, "Fsce Distortion is not due to lens distortion," Daniel's Visionarium: A blog about vistual perception, May 5, 2012, 2 pages, https://bakerdh.wordpress.com/2012/05/05/face-distortion-is-not-due-to-lens-distortion/.
(Continued)

*Primary Examiner* — Twyler L Haskins
*Assistant Examiner* — Akshay Trehan
(74) *Attorney, Agent, or Firm* — Daniel P. Morris, Esq.; Hoffmann & Baron, LLP

(57) ABSTRACT

A method for correcting perspective distortion includes acquiring a plurality of images of a given subject by at least one camera of a mobile device, wherein each of the images is taken using respective actual settings for the camera captured by at least one sensor of the mobile device. The method further includes processing the images and the respective actual settings for each of the images to synthesize a single image of the given subject, wherein the single image emulates using specified virtual settings for the camera. The method further comprises displaying the synthesized single image of the given subject to a user of the mobile device.

18 Claims, 5 Drawing Sheets

(51) Int. Cl.
  H04N 5/225       (2006.01)
  H04N 5/232       (2006.01)
  G06T 5/00        (2006.01)
  H04M 1/725       (2006.01)
  G06T 5/50        (2006.01)

(52) U.S. Cl.
  CPC ....... H04N 5/2258 (2013.01); H04N 5/23232 (2013.01); H04N 5/23293 (2013.01); H04N 5/2621 (2013.01); H04N 5/2628 (2013.01); *G06T 2207/10016* (2013.01); *G06T 2207/20221* (2013.01); *H04M 1/72569* (2013.01); *H04M 1/72572* (2013.01); *H04M 2250/52* (2013.01)

(58) Field of Classification Search
  CPC .... H04N 5/265; H04N 5/2621; H04N 5/2628; H04N 5/23293; H04N 5/23232; G06T 5/002; G06T 5/006; G06T 5/50; G06T 2207/20221; G06T 2207/10016; H04M 1/72569; H04M 1/72572; H04M 2250/52
  See application file for complete search history.

(56) References Cited

U.S. PATENT DOCUMENTS

| | | | |
|---|---|---|---|
| 6,388,664 B2 | 5/2002 | Sone | |
| 6,903,735 B2* | 6/2005 | Jeong | H04N 13/0014 345/418 |
| 7,224,392 B2 | 5/2007 | Cahill et al. | |
| 7,391,442 B1 | 6/2008 | Fleischman et al. | |
| 7,570,803 B2* | 8/2009 | Criminisi | H04N 7/144 382/154 |
| 8,000,559 B2 | 8/2011 | Kwon | |
| 8,619,148 B1* | 12/2013 | Watts | G06T 5/006 348/218.1 |
| 8,744,329 B2 | 6/2014 | Bledsoe | |
| 8,994,780 B2* | 3/2015 | Moore | H04N 13/239 348/14.08 |
| 9,088,714 B2 | 7/2015 | Doepke et al. | |
| 9,153,014 B2 | 10/2015 | Yu et al. | |
| 9,743,016 B2* | 8/2017 | Nestares | H04N 5/262 |
| 10,091,405 B2* | 10/2018 | Molina | H04N 5/2258 |
| 2004/0061787 A1* | 4/2004 | Liu | H04N 5/232 348/218.1 |
| 2004/0196379 A1* | 10/2004 | Chen | G06K 9/209 348/218.1 |
| 2005/0018175 A1 | 1/2005 | Cheng | |
| 2005/0175257 A1* | 8/2005 | Kuroki | H04N 7/144 382/278 |
| 2008/0218613 A1* | 9/2008 | Janson | G03B 15/00 348/262 |
| 2012/0074227 A1* | 3/2012 | Ferren | G02B 13/0065 235/462.21 |
| 2012/0105579 A1* | 5/2012 | Jeon | H04N 5/2258 348/38 |
| 2012/0293633 A1* | 11/2012 | Yamato | G01C 11/06 348/47 |
| 2012/0307020 A1* | 12/2012 | Hirano | H04N 5/2226 348/49 |
| 2013/0021447 A1* | 1/2013 | Brisedoux | H04N 5/2258 348/47 |
| 2013/0058591 A1* | 3/2013 | Nishiyama | H04N 5/217 382/264 |
| 2013/0169844 A1* | 7/2013 | Watts | G06T 5/006 348/239 |
| 2013/0258044 A1* | 10/2013 | Betts-Lacroix | H04N 13/0242 13/242 |
| 2014/0132735 A1* | 5/2014 | Lee | H04N 5/2258 348/47 |
| 2014/0340543 A1* | 11/2014 | Nakada | H04N 5/23229 348/239 |
| 2015/0116529 A1* | 4/2015 | Wu | H04N 5/23222 348/222.1 |
| 2016/0134803 A1* | 5/2016 | Deng | H04N 5/23222 348/222.1 |
| 2016/0286120 A1* | 9/2016 | Kuo | H04N 5/23245 |
| 2016/0316149 A1* | 10/2016 | Chou | H04N 5/23296 |
| 2017/0150067 A1* | 5/2017 | Han | H04N 5/23229 |

FOREIGN PATENT DOCUMENTS

| | | |
|---|---|---|
| JP | P2002-335438 A | 11/2002 |
| KR | 100456632 B1 | 11/2004 |
| KR | 100513789 B1 | 9/2005 |
| KR | 1020070004202 A | 1/2007 |
| TW | 200708067 A | 2/2007 |
| WO | 2016/03709 A1 | 3/2006 |

OTHER PUBLICATIONS

Wikipedia, "Perspective distortion (photography)," Aug. 27, 2017, 7 pages, https://en.wikipedia.org/w/index.php?title=Perspective_distortion_(photography)&oldid=79752211.
BNP Media, "Laser Displacement Sensors," Quality Magazine, Aug. 13, 2017, 1 page, https://www.qualitymag.com/articles/85051-laser-displacement-sensors.
M. Panzarino, "Here's an Actual 3D Indoor Map of a Room Captured With Google's Project Tango Phone," TechChrunch, Feb. 21, 2014, 3 pages, https://techcrunch.com/2014/02/21/heres-an-actual-3d-indoor-map-of-a-room-captured-with-googles-project-tango-phone/.
INTERSIL, "TW2871 Data Sheet," FN7989, Rev. 1.00, Dec. 20, 2012, 2 pages, https://www.intersil.com/content/dam/intersil/documents/tw28/tw2871.pdf.
R. Butler, "A distorted view? In-camera distortion correction," Digital Photography Review, Sep. 2, 2011, 11 pages, https://www.dpreview.com/articles/5653763779/a-distorted-view-in-camera-distortion-correction.
Fuji Xerox, "Camera Image Correction Technology," 2 pages, http://www.fujixerox.com/eng/company/technology/production/cloud/image.corr.html.
C. Prakoso, "SKRWT With Perspective and Barrel Distortion," Moblivious, May 31, 2014, 26 pages, http://moblivious.com/reviews/skrwt/.
K. Collins, "Nixie wearable camera drone wins Intel's $500,000 tech challenge," Wired UK, Nov. 3, 2014, 5 pages, http://www.wired.co.uk/article/nixie-drone-wins-intel-wearable-competition.
R. Wong, "Phone with dual front-facing cameras is perfect for selfie fanatics," Mashable, Jan. 19, 2017, 6 pages, http://mashable.com/2017/01/19/vivo-v5-dual-selfie-camera-phone/.

* cited by examiner

ORTHO-SELFIE DISTORTION CORRECTION USING MULTIPLE IMAGE SENSORS TO SYNTHESIZE A VIRTUAL IMAGE

BACKGROUND

The present invention relates to the electrical, electronic and computer arts, and, more particularly, to correcting perspective distortion.

In photography, perspective distortion is a warping or transformation of an object and its surrounding area that differs significantly from what the object would look like with a normal focal length, due to the relative scale of nearby and distant features. Perspective distortion is determined by the relative distances at which the image is captured and viewed, and is due to the angle of view of the image (as captured) being either wider or narrower than the angle of view at which the image is viewed, hence the apparent relative distances differing from what is expected. When taking a self-portrait photo ("selfie") using a mobile camera (e.g., integrated with a smart phone), due to the small focal length of the mobile device, and the limited distance (e.g., arm reach) the images are distorted (e.g., "fish eye effect" or "barrel distortion"). This is a form of extension or wide-angle distortion, in which an object close to the lens (e.g., the subject's face) appears abnormally large relative to more distant objects, while distant objects appear abnormally small and hence more distant.

One solution is to mount the mobile device further away and use a timer activated camera mode. However, there are several limitations to this approach. The mobile device may fall and get damaged if the mounting is not secured well. Especially in crowded places, there is a risk of device theft or incidental damage to the unattended device. Directional mounting of the device can be difficult, as part of the objects of interest (e.g., the subject of the photograph) is not in the frame during the mounting process. Also, timing control of the camera is limited compared to direct instantaneous control of the shutter.

Another option is to ask another person to take a photograph on one's behalf. However, there are again limitations to this approach. A stranger may steal the device. Sometimes, no person can be found available to take the photograph. Also, the photographer may not be familiar with the operation of the camera on the mobile device and as a result either fail to take a photo, or take a photo which out of focus, out of frame, or without an adequate level of brightness.

Alternatively, one can use a selfie-pole, although this solution is cumbersome. Also, one may wish to take a self photo from a perspective where the mobile device cannot be mounted (e.g., up in the air). Another approach is to have a remote controlled drone equipped with a camera. This option can be problematic in small places, and may involve safety issues. This approach also requires special equipment (e.g., a drone), and flying drones while capturing images typically requires experience and skill.

A further option is image correction with an ISP (image signal processor). However, this requires the lens geometry to be programmed into the device so that a correction can be made. Also, the system (which is not mobile) is generally designed for IP (internet protocol) cameras. This solution applies a fixed correction to the image, and cannot incorporate a desired perspective and/or various distances of the object. An additional option is software correction to reverse the distortion effect. This requires inputting geometrical knowledge of the camera lens, and potentially chromatic information regarding the lens. However, a single image is considered, without considering the orientation of the camera or the subject. Thus, it is not possible to define a desired perspective. Also, a fixed correction is irrespective of the actual distortion.

SUMMARY

An embodiment of the present invention includes a method for use in correcting perspective distortion. The method comprises acquiring a plurality of images of a given subject by at least one camera of a mobile device, wherein each of the plurality of images is taken using respective actual settings for the camera captured by at least one sensor of the mobile device. The method also comprises processing the plurality of images and the respective actual settings for each of the plurality of images to synthesize a single image of the given subject, wherein the single image emulates using specified virtual settings for the at least one camera. The method further comprises displaying the synthesized single image of the given subject to a user of the mobile device.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. An exemplary embodiment of the present invention overcomes the limitations of the prior art discussed above and satisfied the long-felt but unmet need to correct for such distortions. For example, an illustrative embodiment can synthesize a single shot from a desired perspective based on a sequence or a movie of an object from multiple angles (e.g., using multiple sensors on a mobile device). An exemplary embodiment can record this information and mathematically reconstruct a high-fidelity representation of the image of the object, thus correcting distortion that would have been recorded with a single, traditional camera shot. Specifically, an exemplary embodiment displays a corrected image having a desired location, orientation/attitude and focal length. Thus, an illustrative embodiment of the invention emulates taking a photo from an arbitrary point in space.

These and other features and advantages of the present invention will become apparent from the following detailed description of illustrative embodiments thereof, which is to be read in connection with the accompanying drawings.

DETAILED DESCRIPTION

Figure 1:
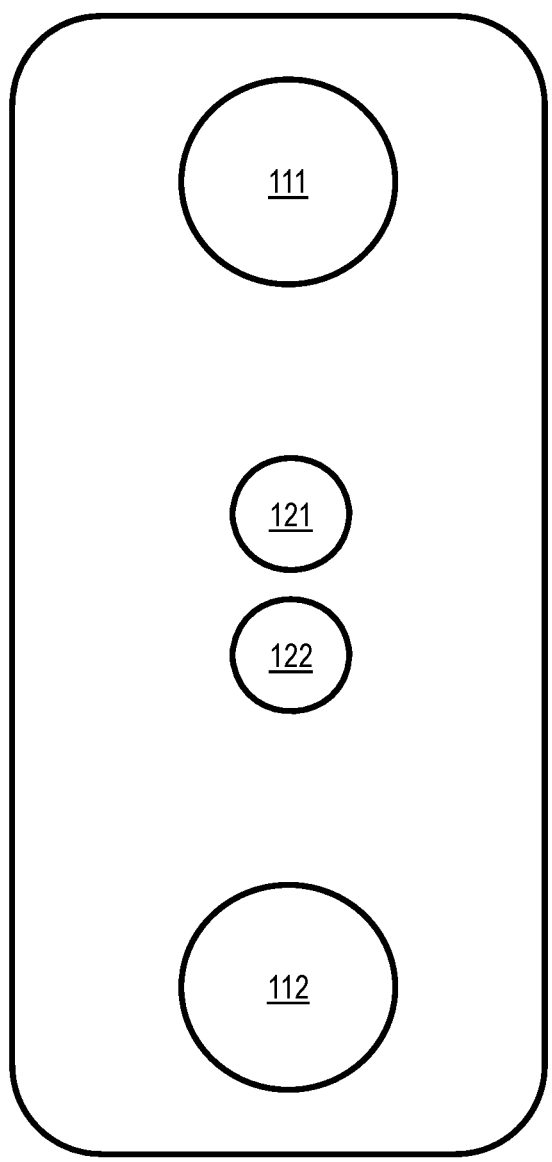
FIG. 1 shows an exemplary mobile device suitable for use with an illustrative embodiment of the present invention

FIG. 1 shows an exemplary mobile device 100 suitable for use with an illustrative embodiment of the present invention. Mobile device 100, which may be a smart phone, includes two cameras 111 and 112 mounted several inches apart. As discussed above, cameras 111 and 112 will typically have a short focal length. Mobile device 100 also includes respective flashes 121 and 122 for each of the aforementioned cameras. It is important to note that inventive techniques may be applied to mobile devices different than that shown in FIG. 1. Mobile device 100 could include any number of cameras and flashes. For example, mobile device 100 may have multiple cameras 111 and 112 sharing a single flash 121 (e.g., with flash 122 omitted). Mobile device 100 may have only a single camera 111 (e.g., with camera 112 omitted).

Figure 2:
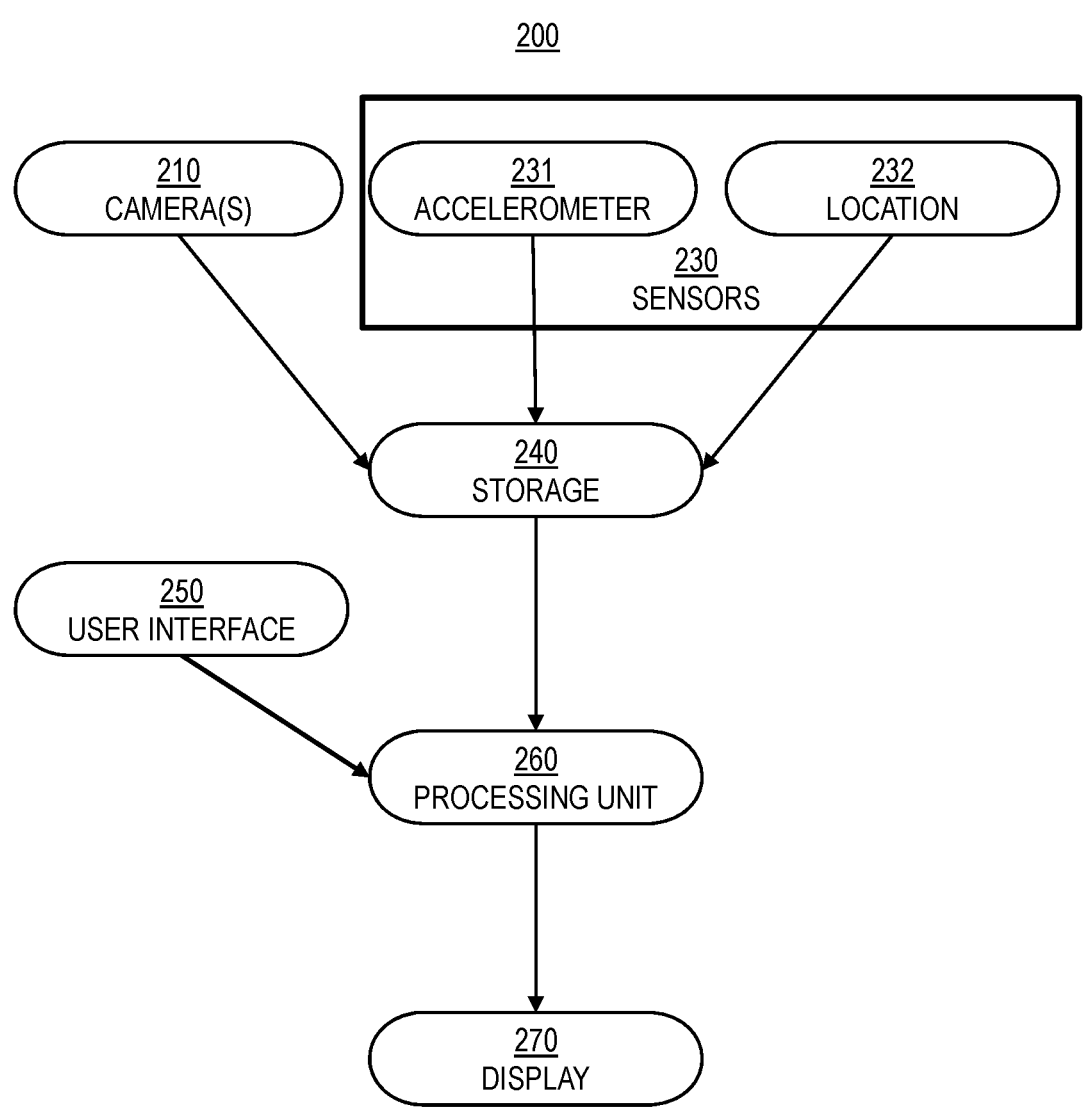
FIG. 2 shows an exemplary architecture for a system implementing an illustrative embodiment of the present invention.

FIG. 2 shows an exemplary architecture for a system 200 implementing an illustrative embodiment of the present invention. System 200 may comprise a mobile device, such as a smart phone, with all of the components within system 200 contained within the mobile device, although this is not a requirement of the invention. For example, principles of the present invention could be applied to other cameras and/or image capture devices, e.g., having a short focal length. Camera(s) 210 represent one or more cameras, each of which, as discussed above, is typically a short focal length camera. As discussed above with reference with FIG. 1, some embodiments may include multiple cameras on the same mobile device, while other embodiments may include only a single camera on the mobile device.

Sensors 230 may include, for example, one or more accelerometers 231 (for detecting movement of the mobile device 200) and/or one or more location sensors 232 (for determining, for example, where the mobile device 200 is relative to the subject of a photograph). Location sensors 232 may, for example, differential Global Positioning System (dGPS) to obtain fine detail level location of the camera(s) 210. Additionally or alternatively, sensors 230 may include one or more luminosity sensors and/or a compass. Moreover, sensors 230 may additionally or alternatively include one or more sensors that provides depth, e.g., using a sliding focus change.

In an illustrative embodiment, camera(s) 210 capture a sequence or a movie of an object from multiple angles. This may involve moving the mobile device 200 and/or camera(s) 210 (either by user or autonomously) during an image capture/acquisition process. However, in embodiments similar to that shown in FIG. 1, where a plurality of cameras 111 and 112 are spaced apart from each other, movement may not be necessary to capture multiple angles. The image sequence or movie captured by camera(s) 210 are written to storage 240, which may include random-access memory (RAM), flash memory, memory cards, etc.

Storage 240 preferably records the exact location and directional orientation of the camera as well as the distance to the object for every shot, as determined by sensors 230. Storage 240 may also record information regarding camera settings such as focal length and shutter speed, which may also be determined by sensors 230.

User interface 250 obtains input from a user, and may include, for example, a touch screen, keyboard, and/or mouse. This input may include, for example, information regarding the actual camera settings, as discussed above with reference to elements 230 and 240, and/or selection of virtual camera settings (e.g., location, aspect ratio and focal length), discussed in further detail below with reference to FIG. 4. The input obtained by user interface 250 is preferably written to storage 240.

As further discussed below, processing unit 260 is operative to read data from storage 240 (e.g., data obtained by camera(s) 210, sensors 230, and/or user interface 250) and to perform an image registration process for perspective distortion correction, preferably including a 3D image registration process to map locations of image constituents. Specifically, in an illustrative embodiment, processing unit 260 is operative to co-register the images (e.g., captured by camera(s) 210) based on the camera-object orientation (e.g., determined by sensors 230) in order to synthesize a single shot from a desired perspective. In other words, in an illustrative embodiment, processing unit 260 mathematically reconstructs a high-fidelity representation of the image of the object, thus correcting distortion that would have been recorded with a single, traditional camera shot. Based on the virtual camera location, aspect ratio and focal length (e.g., selected by a user via user interface 250), a corrected image may be synthesized through an image reconstruction process. A corrected image (e.g., at a desired "virtual" location, orientation/attitude and focal length) can then be displayed to the user through display 270.

Figure 3:
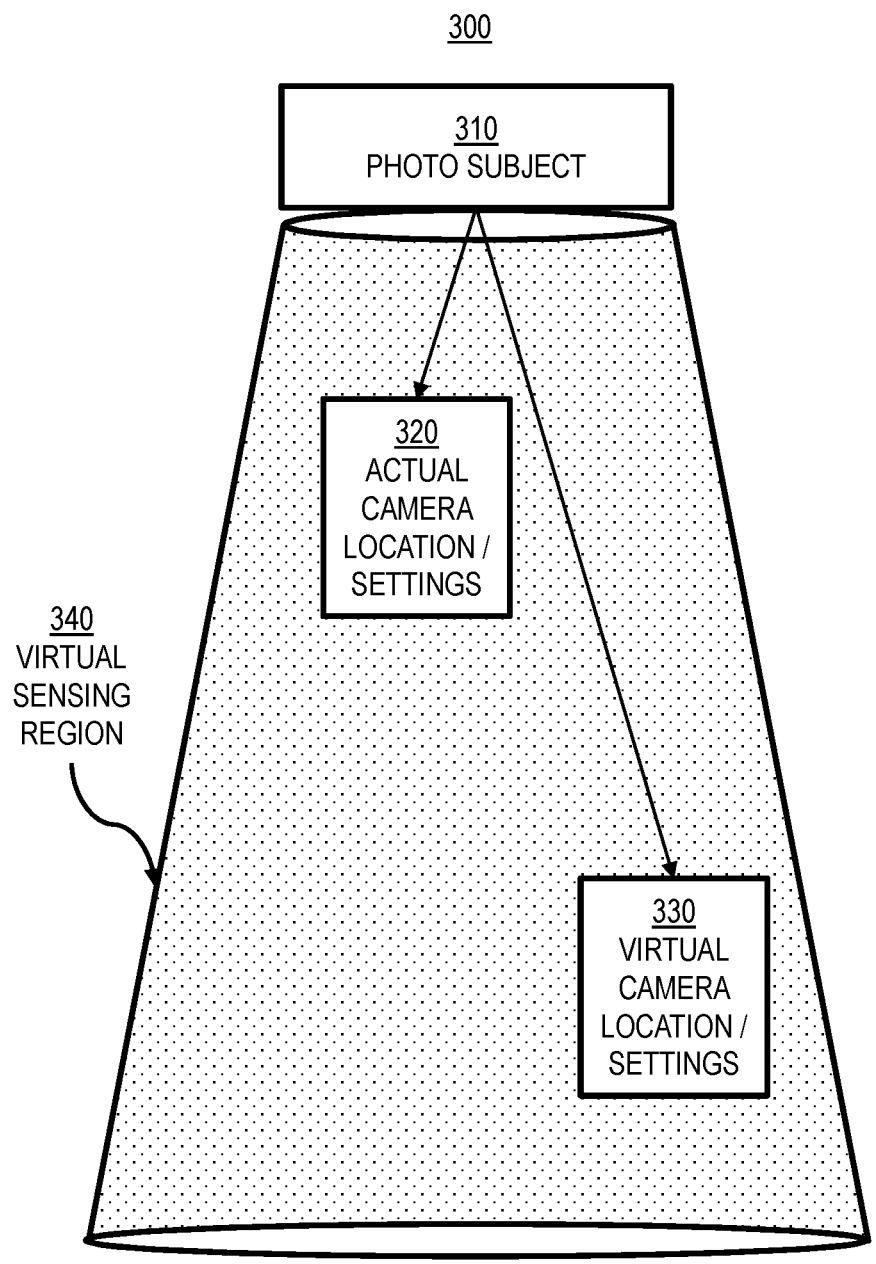
FIG. 3 shows an exemplary use for an illustrative embodiment of the present invention.

FIG. 3 shows an exemplary use 300 for using an illustrative embodiment of the present invention. In FIG. 3, a plurality of images (e.g., a sequence or a movie) of a person and/or object (e.g., a subject of the photograph) 310 are taken by an actual camera (e.g., 111 in FIG. 1 and/or 210 in FIG. 2) at a location 320 using specific settings (e.g., orientation/altitude, aspect ratio, and focal length). Due to the short focal length, location 320 is typically close to the subject. However, as discussed above, processing unit 260 can perform an image registration process for perspective distortion correction, by co-registering the images (e.g., captured by camera(s) 210) based on the camera-object orientation (e.g., determined by sensors 230) in order to synthesize a single shot from a desired perspective: e.g., to generate an image corresponding to virtual camera location 330 and specified settings (e.g., orientation/altitude, aspect ratio, and focal length), which could be input by a user through user interface 250. Indeed, while actual camera location 320 may be constrained by physical limitations (e.g., arm length and/or human height), virtual camera location 330 could potentially be anywhere within virtual sensing region 340, potentially including airborne locations not otherwise accessible without specialized equipment and training. Thus, an illustrative embodiment of the invention emulates taking a photo from an arbitrary point in space.

In an exemplary embodiment, a user may receive feedback (e.g., through display 270) from the system (e.g., 100 in FIG. 1 and/or 200 in FIG. 2) regarding optimal orientation and attitude of the camera (e.g., 111 in FIG. 1 and/or 210 in FIG. 2) throughout the image acquisition process. For example, the system may be able to propose actual camera location and settings (e.g., 320 in FIG. 3) if a desired virtual camera setup (e.g., location and settings 330 in FIG. 3) is known in advance. In another exemplary embodiment, the user may be provided a "walk through" option in the region of feasible captured space and focal lengths (e.g., 340 in FIG. 3), to assist the user in determining a desired virtual camera location and settings (e.g., 330 in FIG. 3), and hence a desired actual camera setup (e.g. 330 in FIG. 3).

Figure 4:
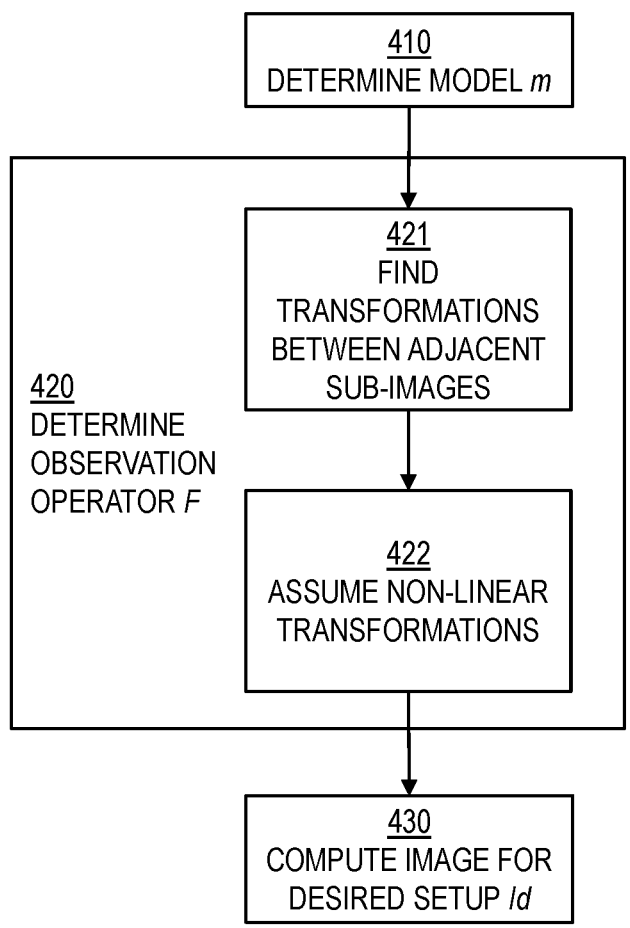
FIG. 4 shows an exemplary algorithm suitable for use in an image registration process according to an illustrative embodiment of the present invention.

FIG. 4 shows an exemplary algorithm 400 suitable for use in an image registration process similar to that discussed above with reference to processing unit 260 in FIG. 2. Step 410, which will be discussed in further detail below, involves determining m, which is a 3D model (e.g., representation) of the objects in the scene. Step 420 involves determining F, which is an observation operator, e.g. image capture transformation representing the non-linear projection process of capturing the model using the camera. Step 420 includes step 421, which involves finding the transformations from each sub-image to another adjacent sub-image. Step 420 also includes step 422, which involves assuming non-linear transformation, as areas which are closer to the camera result in different transformation than areas further away from the camera.

For a given model m, and sensor properties s (e.g. focal length f location r, orientation θ), the observation function F provides the acquired image I, with potential measurement error denoted by ε: I=F(m,s(f,r,θ))+ε. Step 430 involves computing an image (e.g., for a virtual camera) using a desired setup (e.g., perspective). Thus, if multiple actual observations, L for i={1 . . . n} of multiple aspects are recorded, a virtual observation $I_d$ can be computed for a desired (i.e., virtual) perspectives (e.g., focal length $f_d$, location $r_d$, orientation θd): $I_d$=F(m,s($f_d,r_d,θ_d$))+ε. Thus, the image is corrected in step 430 based on the recovered transformations from step 420.

Returning to step 410, in one embodiment, distance measurement is taken using a 2D sensor (e.g., eye-safe laser displacement sensor) and/or a 3D mapping configuration, such that the model is already known. Each pixel in the actual camera images is associated with a distance from the camera. In step 430, for a given virtual sensor position, new distances are calculated (vector sum) and consequently projection of the 3D input is computed for a desired focal length and sensor orientation. $I_d$≈F(m,s($f_d,r_d,θ_d$))

In another embodiment, the 3D model is not given, but rather is be estimated from the set of observations as follows:

$$\hat{m} = \arg\min_{\hat{m}} \mathcal{D}(F(m, s(f_d, r_d, θ_d)), I_i) + \mathcal{R}(m)$$

where: $\mathcal{D}$ is a noise model (misfit function) quantifying the discrepancy between the computed observations and the acquired observations, and $\mathcal{R}$ is a regularization function enabling the incorporation of a priori information. Consequently, in step 430, the desired (e.g., virtual) observation can be computed as follows: $I_d$≈F($\hat{m}$,s($f_d,r_d,θ_d$)).

Given the discussion thus far, it will be appreciated that, in general terms, an aspect of the invention includes a method for use in correcting perspective distortion. The method comprises acquiring a plurality of images of a given subject (e.g., 310 in FIG. 3) by at least one camera (e.g., 111 and 112 in FIG. 1 and/or 210 in FIG. 2) of a mobile device (e.g., 100 in FIG. 1 and/or 200 in FIG. 2), wherein each of the plurality of images is taken using respective actual settings (e.g., 330 in FIG. 3) for the at least one camera captured by at least one sensor (e.g., 230 in FIG. 2) of the mobile device. The method also comprises processing (e.g., 260 in FIG. 2 and/or 400 in FIG. 4) the plurality of images and the respective actual settings for each of the plurality of images to synthesize a single image of the given subject, wherein the single image emulates using specified virtual settings (e.g., 340 in FIG. 3) for the at least one camera. The method further comprises displaying (e.g., 270 in FIG. 2) the synthesized single image of the given subject to a user of the mobile device.

One or more embodiments of the invention, or elements thereof, can be implemented, at least in part, in the form of an apparatus including a memory and at least one processor that is coupled to the memory and operative to perform exemplary method steps.

Figure 5:
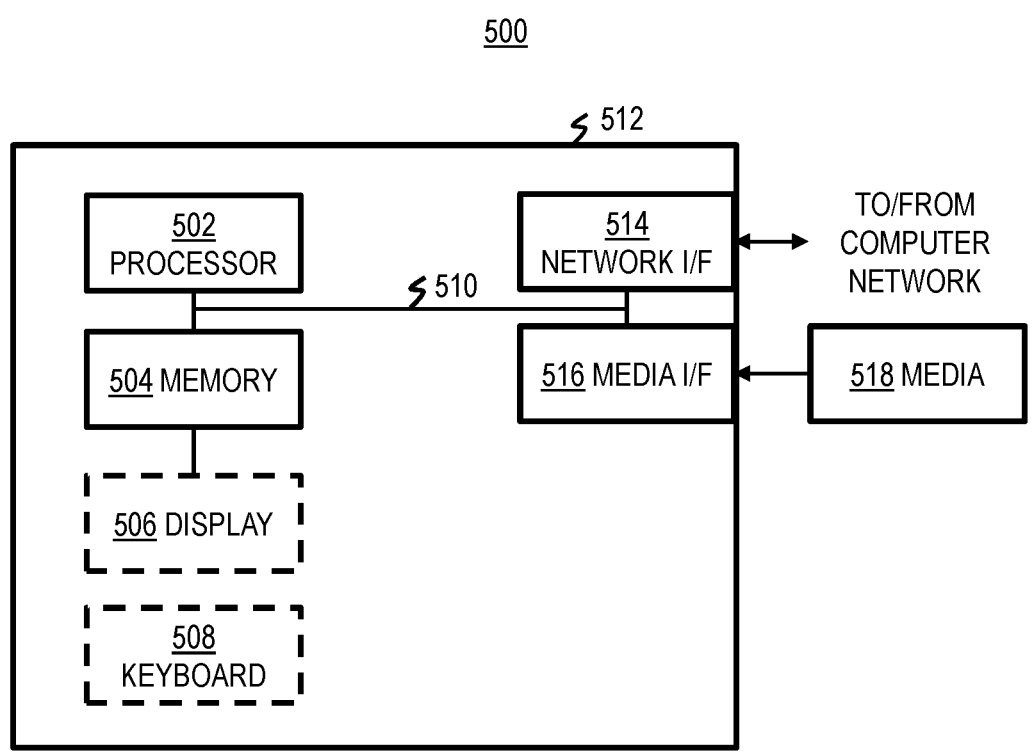
FIG. 5 shows a computer system that may be useful in implementing one or more aspects and/or elements of the invention.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. In one or more embodiments, processor 502 may correspond to processing unit 260 in FIG. 2, memory 504 may correspond to storage 240 in FIG. 2, display 506 may correspond to display 270 in FIG. 2, and/or keyboard 508 may correspond to user interface 250 in FIG. 2.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 502. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for use in correcting perspective distortion, the method comprising:

acquiring a plurality of actual images of a given subject by at least one camera of a mobile device, wherein each of the plurality of images is taken using respective actual settings for the at least one camera captured by at least one sensor of the mobile device, wherein the at least one camera comprises a plurality of cameras spaced apart relative to each other, each pixel of the acquired actual images is associated with a distance from the camera, wherein each pixel represents an actual location of the subject, and wherein a location and directional orientation of the camera is recorded for each of the plurality of images;

processing the plurality of images and the respective actual settings for each of the plurality of images to synthesize a single image of the given subject, wherein the single image emulates using specified virtual settings for the at least one camera, the processing including, obtaining a three-dimensional model of at least the given subject; and determining an image capture transformation representing a non-linear projection process of capturing the model, wherein for a given model m, sensor properties s, focal length f, location r, orientation θ, an observation function F provides the acquired image I, with potential measurement error ε, wherein I=F(m,s(f, r,theta.))+ε;

computing an image using a selected perspective;

recording multiple actual observations, $I_i$ for i={1 ... n} of multiple aspects; and computing a virtual observation $I_d$ for a selected virtual perspective s (focal length $f_d$, location $r_d$, orientation $\theta_d$): $I_d$=F(m,s($f_d$,$r_d$,$\theta_d$))+ε; and displaying the synthesized single image of the given subject to a user of the mobile device.

2. The method of claim 1, wherein the given subject comprises the user of the mobile device.

3. The method of claim 1, wherein the plurality of images comprises a movie of the given subject.

4. The method of claim 1, wherein the actual and virtual settings for the at least one camera each comprise one or more of: a location of the at least one camera relative to the given subject, a distance of the at least one camera relative to the given subject, an orientation of the at least one camera relative to the given subject, and an angle of the at least one camera relative to the given subject.

5. The method of claim 1, wherein the actual and virtual settings for the at least one camera each comprise for the at least one camera comprises one or more of a focal length, an aspect ratio, and a shutter speed.

6. The method of claim 1, wherein the one or more sensors comprises one or more accelerometers and one or more location sensors.

7. The method of claim 6, wherein the one or more location sensors comprise at least one of: one or more global positioning sensor (GPS) sensors, one or more compasses, and one or more laser displacement sensors.

8. The method of claim 1, wherein acquiring the plurality of images of the given subject comprises moving the mobile device to different physical locations between acquiring respective ones of the plurality of images such that the respective ones of plurality of images are taken from the different physical locations.

9. The method of claim 1, wherein acquiring the plurality of images of the given subject comprises: placing the mobile device at a first physical location; acquiring at least a first one of the plurality of images of the given subject by the at least one camera of the mobile device from the first physical location; moving the mobile device from the first physical location to at least a second physical location; and acquiring at least a second one of the plurality of images of the given subject by the at least one camera of the mobile device from at least the second physical location.

10. The method of claim 1, wherein the specified virtual settings are determined by the user and provided to the mobile device.

11. The method of claim 10, further comprising: computing the respective actual settings to be used when the plurality of images of the given subject are taken in order to emulate the specified virtual settings when synthesizing the single image of the subject; providing the computed respective actual settings to the user to facilitate acquiring the plurality of images and synthesizing the single image of the subject.

12. The method of claim 1, further comprising allowing the user to virtually explore a region of feasible captured space to assist the user in determining the specified virtual settings.

13. The method of claim 1, wherein the specified virtual settings comprise at least one setting which cannot be among the actual settings due to one or more physical constraints.

14. The method of claim 13, wherein the one or more physical constraints comprise a height or limb length of the user of the mobile device.

15. The method of claim 1, wherein obtaining the three-dimensional model comprises at least one of: obtaining one or more distance measurements taken using a two-dimensional sensor among the one or more sensors, and obtaining a three-dimensional mapping configuration.

16. The method of claim 1, wherein obtaining the three-dimensional model comprises estimating the three-dimensional model from the plurality of images and the respective actual setting for each of the plurality of images using a misfit function and a regularization function.

17. A mobile device comprising:
a plurality of cameras spaced apart relative to each other;
at least one sensor;
a memory; and
at least one processor coupled with the memory, the processor operative:
to acquire a plurality of actual images of a given subject by the at least one camera, wherein each of the plurality of actual images is taken using respective actual settings for the plurality of cameras captured by the at least one sensor, each pixel of the acquired actual images is associated with a distance from the camera, wherein each pixel represents an actual location of the subject, and wherein a location and directional orientation of the camera is recorded for each of the plurality of images;
to process the plurality of images and the respective actual settings for each of the plurality of images to synthesize a single image of the given subject, wherein the single image emulates using specified virtual settings for the at least one camera, wherein the processing includes obtaining a three-dimensional model of at least the given subject; and determining an image capture transformation representing a non-linear projection process of capturing the model, wherein for a given model m, sensor properties s, focal length f, location r, orientation $\theta$, an observation function F provides the acquired image I, with potential measurement error $\varepsilon$, wherein $I=F(m,s(f,r,theta.))+\varepsilon$;
computing an image using a selected perspective;
recording multiple actual observations, $I_i$ for $i=\{1 \ldots n\}$ of multiple aspects; and
computing a virtual observation $I_d$ for a selected virtual perspective s (focal length $f_d$, location $r_d$, orientation $\theta_d$): $I_d=F(m,s(f_d,r_d,\theta_d))+\varepsilon$; and
to display the synthesized single image of the given subject to a user of the mobile device.

18. A computer program product computer program product comprising a non-transitory machine-readable storage medium having machine-readable program code embodied therewith, said machine-readable program code comprising machine-readable program code configured:
to acquire a plurality of actual images of a given subject by a plurality of spaced cameras of a mobile device, wherein each of the plurality of actual images is taken using respective actual settings for the at least one camera captured by at least one sensor of the mobile device, wherein each pixel of the acquired actual images is associated with a distance from the camera, wherein each pixel represents an actual location of the subject, and wherein a location and directional orientation of the camera is recorded for each of the plurality of images;
to process the plurality of images and the respective actual settings for each of the plurality of images to synthesize a single image of the given subject, wherein the single image emulates using specified virtual settings for the at least one camera, wherein the processing includes obtaining a three-dimensional model of at least the given subject; and determining an image capture transformation representing a non-linear projection process of capturing the model, wherein for a given model m, sensor properties s, focal length f, location r, orientation $\theta$, an observation function F provides the acquired image I, with potential measurement error $\varepsilon$, wherein $I=F(m,s(f, r,theta.))+\varepsilon$;
computing an image using a selected perspective;
recording multiple actual observations, $I_i$ for $i=\{1 \ldots n\}$ of multiple aspects; and
computing a virtual observation $I_d$ for a selected virtual perspective s (focal length $f_d$, location $r_d$, orientation $\theta_d$): $I_d=F(m,s(f_d,r_d,\theta_d))+\varepsilon$; and
to display the synthesized single image of the given subject to a user of the mobile device.

* * * * *